United States Patent

Tominaga

(10) Patent No.: US 9,522,651 B2
(45) Date of Patent: Dec. 20, 2016

(54) OPERATIONAL OMISSION NOTIFICATION METHOD AND OPERATIONAL OMISSION NOTIFICATION SYSTEM

(71) Applicant: Hiroshi Tominaga, Toyota (JP)

(72) Inventor: Hiroshi Tominaga, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 14/136,862

(22) Filed: Dec. 20, 2013

(65) Prior Publication Data

US 2014/0176326 A1    Jun. 26, 2014

(30) Foreign Application Priority Data

Dec. 21, 2012    (JP) .................................. 2012-278899

(51) Int. Cl.
| | | |
|---|---|---|
| B60Q 1/00 | (2006.01) | |
| B60R 25/10 | (2013.01) | |
| G08B 1/08 | (2006.01) | |
| G08G 1/123 | (2006.01) | |
| B60R 25/20 | (2013.01) | |
| B60Q 9/00 | (2006.01) | |
| G08G 1/00 | (2006.01) | |

(52) U.S. Cl.
CPC .......... B60R 25/2009 (2013.01); B60Q 9/001 (2013.01); G08G 1/207 (2013.01)

(58) Field of Classification Search
CPC .......... B60Q 1/10; B60Q 9/001; G06F 19/00; H04W 4/02; H04W 4/046; B60K 35/00; B60R 1/12; B60R 25/24; B60R 25/102; G06Q 10/08; G06Q 10/10; G08G 1/205; G07C 5/008

USPC ............ 340/457, 426.15, 438, 425.5, 426.2, 340/539.1, 539.13, 988; 701/2, 29
See application file for complete search history.

(56) References Cited

U.S. PATENT DOCUMENTS

| | | | | |
|---|---|---|---|---|
| 2005/0184862 A1* | 8/2005 | Nagata | ................... | B60Q 9/001 340/457 |
| 2005/0283286 A1* | 12/2005 | Kanda | ................. | B60R 16/0232 701/29.6 |
| 2006/0255911 A1* | 11/2006 | Taki | ....................... | B60R 25/24 340/5.72 |

FOREIGN PATENT DOCUMENTS

| | | |
|---|---|---|
| JP | 2005-240349 A | 9/2005 |
| JP | 2005344335 A | 12/2005 |
| JP | 2006-033777 A | 2/2006 |
| JP | 2006-350565 A | 12/2006 |
| JP | 2010-159615 A | 7/2010 |
| JP | 2010205063 A | 9/2010 |

* cited by examiner

*Primary Examiner* — George Bugg
*Assistant Examiner* — Munear Akki
(74) *Attorney, Agent, or Firm* — Sughrue Mion, PLLC

(57) ABSTRACT

An operational omission notification method for performing operational omission notification to a terminal unit of a user of a vehicle when the user forgets to operate vehicle equipment after the vehicle has been parked, the method including: detecting an operational omission of equipment installed on the vehicle after the vehicle has been parked; determining whether the vehicle is parked in an object region classified into a predetermined category; and notifying the terminal unit when it is determined that the vehicle is not parked within the object region.

2 Claims, 4 Drawing Sheets

OPERATIONAL OMISSION NOTIFICATION METHOD AND OPERATIONAL OMISSION NOTIFICATION SYSTEM

INCORPORATION BY REFERENCE

The disclosure of Japanese Patent Application No. 2012-278899 filed on Dec. 21, 2012 including the specification, drawings and abstract is incorporated herein by reference in its entirety.

BACKGROUND OF THE INVENTION

1. Field of the Invention

The invention relates to an operational omission notification method and an operational omission notification system for performing operational omission notification when operational omission of vehicle equipment is detected.

2. Description of Related Art

An operational omission notification method is available for performing operational omission notification to a terminal unit of a vehicle user when an operational omission (a window is not closed, a door is not locked, or the like) of vehicle equipment is detected after the vehicle has been parked. A vehicle operational omission notification system using such an operational omission notification method is described in Japanese Patent Application Publication No. 2005-240349 (JP 2005-240349 A).

More specifically, the vehicle operational omission notification system described in JP 2005-240349 A includes an onboard notification device installed on the vehicle, a center unit disposed as a service center, and a user unit handled by the user. The onboard notification device determines whether the operational omission is present after the user has moved away from the vehicle. Where the presence of an operational omission is detected, the onboard notification device automatically notifies the center unit of operational omission information relating to the operational omission through a communication network. Where the center unit receives the operational omission information from the onboard notification device, the center unit notifies, automatically or by an operator, the user unit, which has been registered in advance, of the received operational omission information via the communication network.

However, with the above-described operational omission notification method, where a condition for performing operational omission notification is fulfilled, the operational omission notification is performed even when, for example, the user has not forgotten to operate the vehicle equipment and there is no need to operate the equipment. In other words, the operational omission notification is sometimes performed even when it is unnecessary for the user. Therefore, the operational omission notification can be cumbersome for the user.

SUMMARY OF THE INVENTION

The invention provides an operational omission notification method and an operational omission notification system that can reduce the number of operational omission notifications that are unnecessary for the user.

An operational omission notification method according to a first aspect of the invention serves for performing operational omission notification to a terminal unit of a user of a vehicle when the user forgets to operate an equipment of the vehicle after the vehicle has been parked, the method including: detecting an operational omission of the equipment installed on the vehicle after the vehicle has been parked; determining whether the vehicle is parked in an object region classified into a predetermined category; and notifying the terminal unit when it is determined that the vehicle is not parked within the object region.

An operational omission notification system according to a second aspect of the invention serves for performing operational omission notification to a terminal unit of a user of a vehicle when the user forgets to operate an equipment of the vehicle after the vehicle has been parked, the system including: a communication device that receives information relating to a state of the equipment after the vehicle has been parked; and a notification determination unit that detects an operational omission on the basis of the information relating to the state of the equipment received by the communication device, determines whether the vehicle is parked in an object region classified into a predetermined category, and when it is determined that the vehicle is not parked within the object region, determines to notify the terminal unit of the operational omission.

According to the above-described aspects, the operational omission notification to the terminal unit is performed when an operational omission of the equipment is detected and it is determined that the vehicle is not parked within an object region classified into a predetermined category. Thus, when the vehicle is parked within the object region classified into the predetermined category, the operational omission notification to the terminal unit is not performed. Therefore, the number of operational omission notifications which are unnecessary for the user can be reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The embodiment is described hereinbelow in detail with reference to FIGS. 1 to 4.

Figure 1:
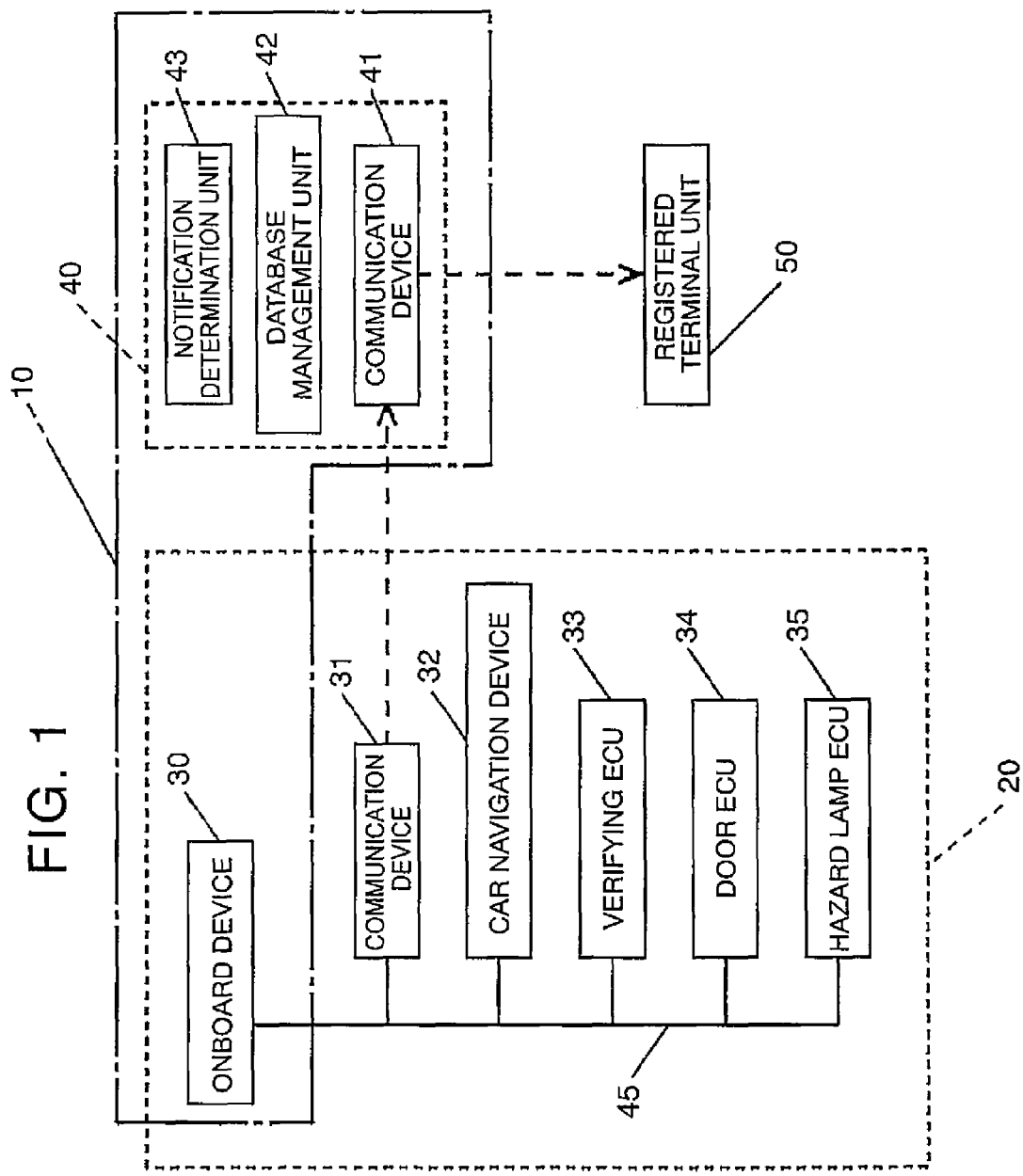
FIG. 1 is a schematic configuration diagram of the operational omission notification system according to the present embodiment of the invention.

FIG. 1 is a schematic configuration diagram of an operational omission notification system 10 according to the present embodiment. Prior to explaining the operational omission notification system 10, a vehicle 20 carrying the below-described onboard unit 30 will be explained.

The vehicle 20 is, for example, an automobile (engine automobile, hybrid automobile, electric automobile, and the like). In the vehicle 20, the below-described onboard unit 30, a communication device 31, a car navigation device 32, a plurality of electronic control units (ECUs) 33 to 35, and a plurality of sensors (not shown in the figure) are connected to each other by an onboard local area network (LAN) 45. The plurality of ECU 33 to 35 includes, for example, an engine ECU (not shown in the figure), a power source ECU (not shown in the figure), a verifying ECU 33, a door ECU 34 provided at each door, and a hazard lamp ECU 35. The plurality of sensors includes a window position detection sensor, a courtesy switch, and a set sensor.

The vehicle 20 is provided with an electronic key performing wireless communication with the communication device installed on the vehicle 20. The electronic key belongs to the driver. The verifying ECU 33 periodically transmits a request signal to the outside of the vehicle by using the external communication device of the vehicle 20 within a parking period of time of the vehicle 20. Where a response signal is received from the electronic key that has received the request signal, the verifying ECU 33 determines that the external communication has been established and performs ID verification (external verification) of the electronic key. Where the external verification is confirmed to be successful, the verifying ECU 33 allows the door locks to be locked and unlocked. The radio wave intensity of the request signal generated by the external communication device is set to be about several meters. Therefore, where the distance between the vehicle 20 and the electronic key exceeds the range in which communication is possible, the external communication is not established. Whether the electronic key (in other words, the driver who possesses the electronic key) is present in the vicinity of the vehicle 20 can be detected on the basis of whether the external communication is established.

The verifying ECU 33 also transmits a request signal inside the vehicle by using the internal communication device of the vehicle 20. The verifying ECU 33 determines that the internal communication has been established by receiving a response signal from the electronic key that has received the request signal, and performs ID verification (internal verification) of the electronic key. Where the internal verification is confirmed to be successful, the verifying ECU 33 allows the engine to be started by an engine switch and onboard electric equipment to be actuated. In addition to the electronic key, a physical key, which can be inserted in the lock hole, may be also used in the vehicle 20. The internal verification is confirmed to be established by the physical key being stuck in the lock hole.

(Configuration of Operational Omission Notification System)

The operational omission notification system 10 is explained below. As shown in FIG. 1, the operational omission notification system 10 is provided with the onboard unit 30 installed on the vehicle 20 and a center unit 40 provided, for example, at a service center. The service center is, for example, a telematics center (see FIG. 4).

The onboard unit 30 is, for example, an onboard computer. The onboard unit 30 performs onboard operations including a transmission operation of transmitting vehicle state information representing the state of the vehicle 20 to the center unit 40 and a transmission determination operation of determining whether to execute the transmission operation, those operations being performed within the parking period of time of the vehicle 20. In the present embodiment, the transmission determination operation is configured of a first determination operation, a second determination operation, a third determination operation, and a fourth determination operation. The configuration of the transmission determination operation is not limited to that of the present embodiment.

As the first determination operation, the onboard unit 30 determines whether a first condition of the engine switch of the vehicle 20 being switched from ON to OFF is fulfilled.

When the drive unit (engine in the case of an engine automobile) and onboard electric equipment of the vehicle 20 are switched from ON to OFF by the operation of the engine switch performed by the driver, the onboard unit 30 determines that the first condition is fulfilled. As the second determination operation, the onboard unit 30 determines whether a second condition of the driver having got out of the vehicle 20 is fulfilled. The onboard unit 30 determines that the second condition is fulfilled, for example, when a signal indicating that the internal communication with the electronic key has changed to an unestablished state (for example, a signal indicating that the external communication has been established) is acquired from the verifying ECU 33. As the third determination operation, the onboard unit 30 determines whether a third condition of the onboard LAN 45 being stopped is fulfilled. The onboard unit 30 determines that the third condition is fulfilled, for example, when it is detected that the onboard LAN 45 is stopped on the basis of the output signal of the car navigation device 32. Further, as the fourth determination operation, the onboard unit 30 determines whether a fourth condition of the time elapsed since the fulfillment of the third condition reaching a predetermined determination time N (for example, N=3 min) is fulfilled. The onboard unit 30 determines that the fourth condition is fulfilled when a timer starts when the stop of the onboard LAN 45 is detected and the time elapsed since the start of the timer reaches the determination time N.

The onboard unit 30 determines to execute the transmission operation only when the first condition, second condition, third condition, and fourth condition are all fulfilled. The onboard unit 30 does not determine to execute the transmission operation when even one of the first condition, second condition, third condition, and fourth condition is not fulfilled.

When the onboard unit 30 determines to execute the transmission operation, the onboard unit acquires, prior to performing the transmission operation, the newest window state information for each window indicating whether the window is open and door lock state information for each door lock indicating whether the door lock is open from the door ECU 34, and acquires the newest hazard lamp state information indicating whether the hazard lamp is lit up from the hazard lamp ECU 35. As a result, the onboard unit 30 obtains the vehicle state information including the newest window state information, newest door lock state information, and newest hazard lamp state information.

Further, prior to performing the transmission operation, the onboard unit 30 acquires, in addition to the vehicle state information, vehicle position information (position coordinates on a global positioning system (GPS)) indicating the position of the vehicle 20 from the car navigation device 32 (or GPS onboard device), and also acquires electronic key information indicating whether the external communication with the electronic key has been established at the present point of time from the verifying ECU 33. The onboard unit 30 also acquires vehicle identification information that has been allocated to the vehicle 20. The onboard unit 30 transmits a center notification including the vehicle state information, vehicle position information, electronic key information, and vehicle identification information to the center unit 40 via the communication device 31.

As shown in FIG. 1, the center unit 40 is provided with a communication device 41 for performing communication with the communication device 31 and the below-described registered terminal unit 50, a database management unit 42 storing information on the registered vehicle that has been registered in advance, and a notification determination unit 43 that determines whether to transmit an operational omission notification to the registered terminal unit 50 that has been registered by the owner of the registered vehicle. The information on each registered vehicle includes the vehicle type, vehicle number, vehicle identification information, name of the owner, electronic mail address of the registered terminal unit 50 of the owner, and the like. The registered terminal unit 50 may be a portable terminal unit such as a cellular phone and a smartphone or an electronic key of the registered vehicle.

When the communication device 41 receives the center notification, the center unit 40 determines whether the transmission destination of the center notification is the registered vehicle by using the vehicle identification information included in the center notification and the vehicle identification information stored in the database management unit 42. When it is determined in the center unit 40 that the transmission destination of the center notification is the registered vehicle, the notification determination unit 43 takes the registered vehicle corresponding to the vehicle identification information included in the center notification as the object vehicle 20 and executes the center operation including the operational omission detection operation, notification determination operation, and notification operation.

(Operational Omission Detection Operation)

The notification determination unit 43 determines whether an operational omission of equipment of the object vehicle 20 is present by determining whether the vehicle state information included in the center notification (window state information, door lock state information, and hazard lamp state information) corresponds to a predetermined state. Where it is determined by the operational omission detection operation that the operational omission of equipment of the object vehicle 20 is present, the notification determination unit 43 performs the notification determination operation.

(Notification Determination Operation)

The notification determination unit 43 determines whether to transmit the operational omission notification to the registered terminal unit 50. In the present embodiment, the notification determination operation is performed in order to extract the operational omission notification necessary for the driver, without performing the unnecessary operational omission notification, when an operational omission of equipment of the object vehicle 20 is detected. Further, the operational omission notification is performed only when a mail delivery condition for the operational omission notification is fulfilled as a result of the notification determination operation. Performed in the notification determination operation are a driver position determination operation of determining whether the driver is not in the vicinity of the object vehicle 20 and a vehicle position determination operation of determining whether the object vehicle 20 is parked in an object facility (object region).

Performed in the driver position determination operation are a terminal unit position determination operation using the position information of the registered terminal unit 50 of the owner of the object vehicle 20 and a communication state determination operation using the state of external communication performed by the verifying ECU 33. In the terminal unit position determination operation, the center unit 40 acquires the position information (position coordinates on the GPS) of the registered terminal unit 50 from the registered terminal unit 50 of the owner of the object vehicle 20 by using the GPS. The center unit 40 determines whether the distance from the object vehicle 20 to the registered terminal unit 50 exceeds a predetermined distance on the basis of the vehicle position information included in the center notification and the position information on the registered terminal unit 50. In the communication state determination operation, it is determined whether the electronic key information included in the center notification indicates that "the external communication is not established".

When it is detected by the terminal unit position determination operation that the distance from the object vehicle 20 to the registered terminal unit 50 exceeds the predetermined distance and it is detected by the communication state determination operation that the external communication is not established in the object vehicle 20, the notification determination unit 43 determines that the driver is not present in the vicinity of the object vehicle 20 and performs the vehicle position determination operation.

Either of the terminal unit position determination operation and the communication state determination operation may be performed. For example, when the registered terminal unit 50 does not have a GPS function, only the communication state determination operation is performed. In this case, the vehicle position determination operation is performed when it is detected that the external communication is not established in the object vehicle 20.

In this case, object facilities classified into a predetermined category are registered in the notification determination unit 43 as the object regions which determine that the operational omission notification is not to be executed even when the operational omission of equipment of the object vehicle 20 has been detected. The object region includes facilities providing services to the vehicle, for example, a gasoline stand, a charging stand, an automobile sale facility (for example, a car dealership), and an automobile repair shop. The parking site of the owner of the object vehicle 20 may be also included in the object facilities.

In the vehicle position determination operation, the notification determination unit 43 acquires map information on the surroundings of the object vehicle 20, which includes the position of the object vehicle 20, by using the GPS on the basis of the vehicle position information (position coordinates of the object vehicle 20) included in the center notification. The notification determination unit 43 identifies the positional relationship between the object vehicle 20 and the object facility on the basis of the vehicle position information and map information. The notification determination unit 43 determines whether the object vehicle 20 is parked in the object facility on the basis of the vehicle position information and map information. The notification determination unit 43 transmits the operational omission notification to the registered terminal unit 50 of the object vehicle 20 via the communication device 41 only when it is determined that the object vehicle 20 is parked outside the object facility. When it is determined that the object vehicle 20 is parked in the object facility, the notification determination unit 43 does not transmit the operational omission notification to the registered terminal unit 50 of the object vehicle 20.

More specifically, in order to determine whether the object vehicle 20 is parked in the object facility, the notification determination unit 43 acquires position information (position coordinates on the GPS) of the object facility that is the closest to the object vehicle 20 and determines whether the distance between the object vehicle 20 and the object facility that is the closest to the object vehicle 20 is equal to or less than a predetermined notification determination distance. The notification determination unit 43 transmits the operational omission notification to the registered terminal unit 50 of the object vehicle 20 only when the distance between the object vehicle 20 and the object facility that is the closest to the object vehicle 20 exceeds the notification determination distance. When it is determined that the distance between the object vehicle 20 and the object facility that is the closest to the object vehicle 20 is equal to or less than the notification determination distance, the notification determination unit 43 does not transmit the operational omission notification to the registered terminal unit 50 of the object vehicle 20. In the present embodiment, when the distance between the object vehicle 20 and the object facility that is the closest to the object vehicle 20 is equal to or less than the notification determination distance, it is highly probable that the object vehicle 20 is being serviced, for example, fueled, charged, or repaired, and the driver has not forgotten to operate the equipment of the object vehicle 20 but there is no need to operate the equipment. The operational omission notification is therefore not transmitted.

(Operation of Operational Omission Notification System)

The operational omission notification method performed by the operational omission notification system 10 is explained below. In the operational omission notification method, onboard operations are performed by the onboard unit 30 of the vehicle 20 and center operations are performed by the center unit 40.

Figure 2:
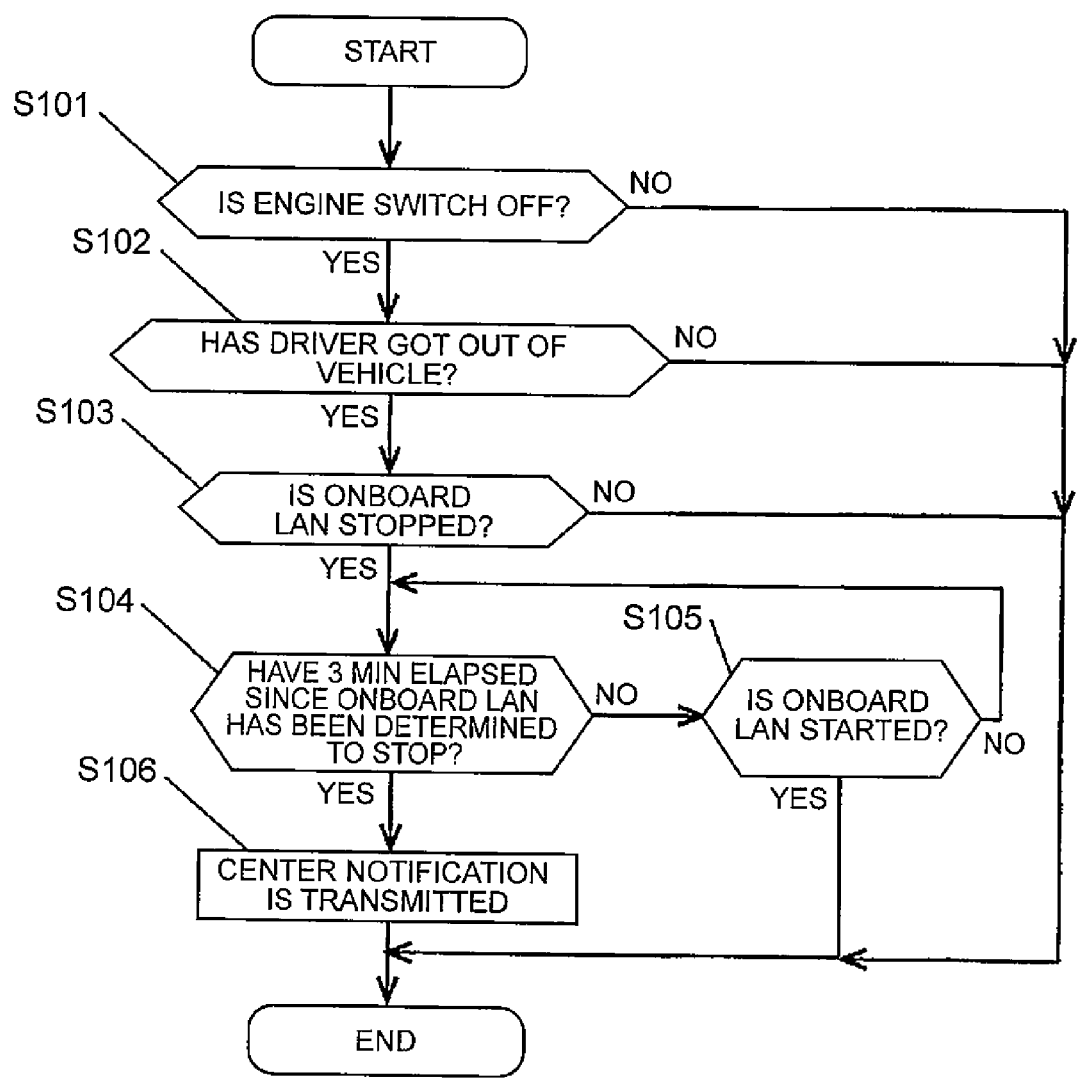
FIG. 2 is a flowchart of onboard operations executed by the onboard unit constituting the operational omission notification system of the embodiment.
Figure 3:
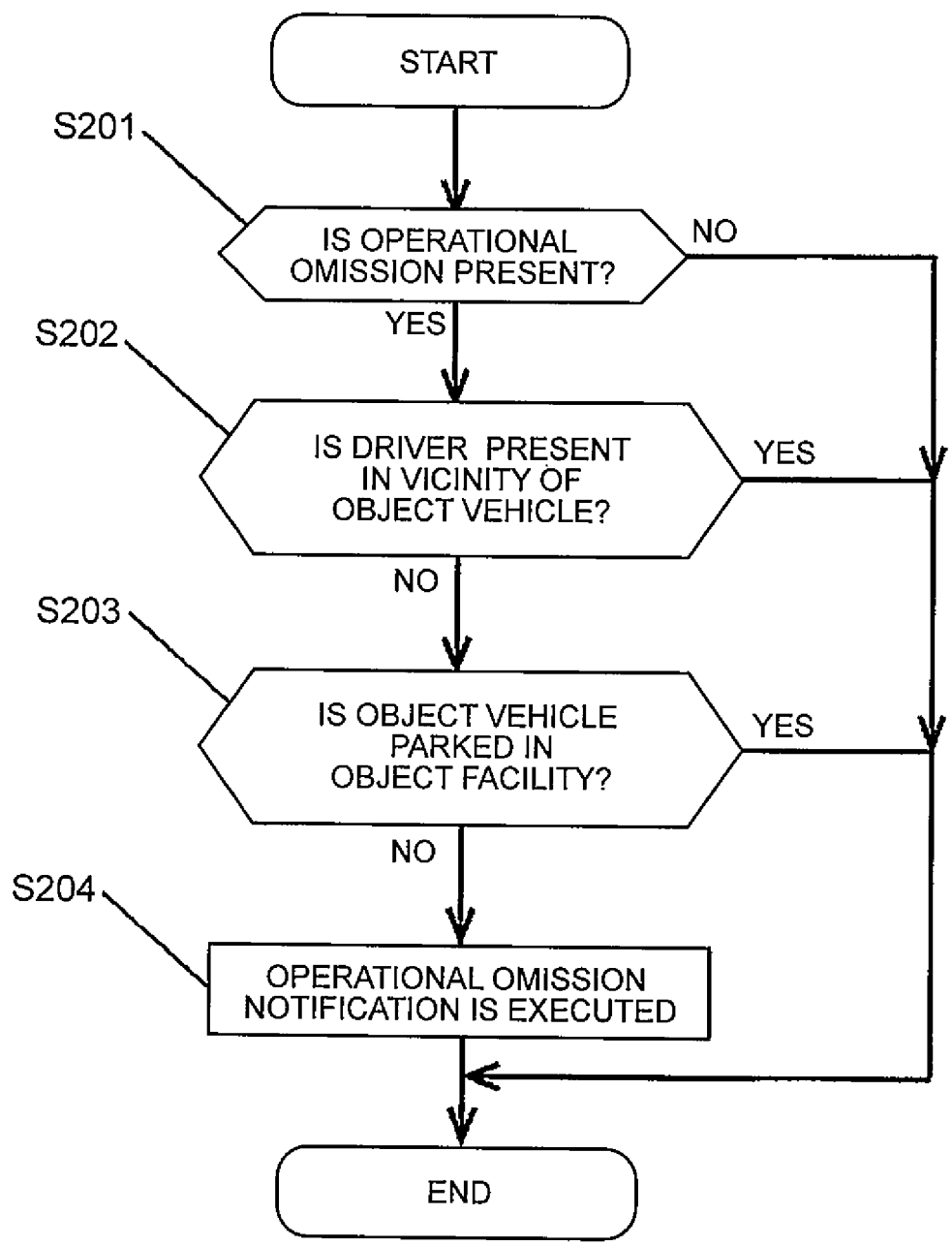
FIG. 3 is a flowchart of operations executed by a center unit constituting the operational omission notification system of the embodiment.
Figure 4:
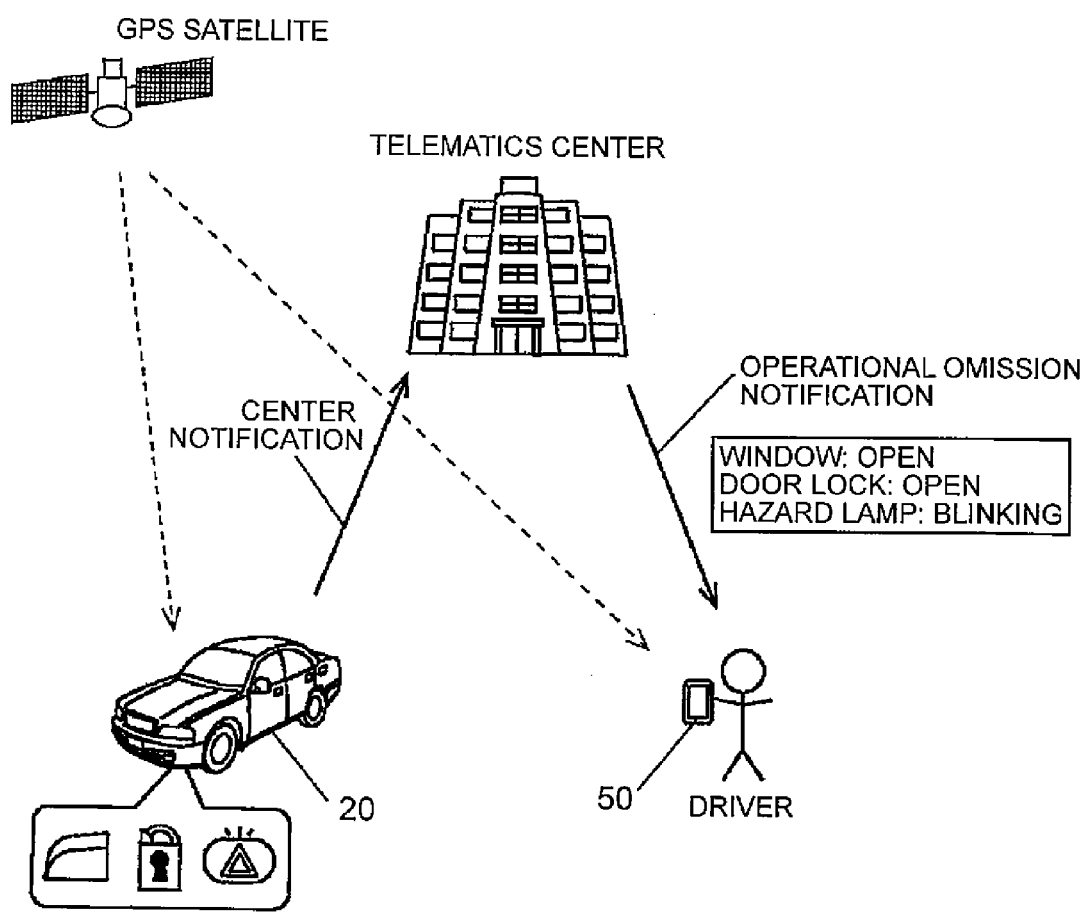
FIG. 4 shows how the operational omission notification of the embodiment is executed, in the registered terminal unit.

First, the onboard operations performed by the onboard unit 30 are explained. FIG. 2 is a flowchart of onboard operations. FIG. 3 is a flowchart of center operations. FIG. 4 illustrates how the operational omission notification is performed in the registered terminal unit 50.

First, the onboard unit 30 performs a transmission determination operation. In the transmission determination operation, as a first determination operation of step S101, the onboard unit 30 determines whether a first condition of the engine switch of the vehicle 20 being switched from ON to OFF is fulfilled. When the first condition is fulfilled, the onboard unit 30 performs a second determination operation of step S102. When the first condition is not fulfilled, the onboard unit 30 ends the onboard operations. The onboard unit 30 performs again the onboard operations after a predetermined time elapses since the end time of the onboard operations as long as the vehicle 20 remains in the parked state. The onboard operations are performed repeatedly.

As the second determination operation of step S102, the onboard unit 30 determines whether a second condition of the driver having got out of the vehicle 20 is fulfilled. When the second condition is fulfilled, the onboard unit 30 performs a third determination operation of step S103. When the second condition is not fulfilled, the onboard unit 30 ends the onboard operations.

As the third determination operation of step S103, the onboard unit 30 determines whether a third condition of the onboard LAN 45 being stopped is fulfilled. When the third condition is fulfilled, the onboard unit 30 performs a fourth determination operation of step S104. When the third condition is not fulfilled, the onboard unit 30 ends the onboard operations.

As the fourth determination operation of step S104, the onboard unit 30 determines whether a fourth condition of the elapsed time since the fulfillment time of the third condition having reached the predetermined determination time N is fulfilled. Where the fourth condition is fulfilled the onboard unit 30 makes a transition to step S106, acquires the vehicle state information including the newest window state information, the newest door lock state information, and the newest hazard lamp state information, and also acquires the vehicle position information, electronic key information, and vehicle identification information. The onboard unit 30 then executes a transmission operation of automatically transmitting the center information including the vehicle state information, vehicle position information, electronic key information, and vehicle identification information to the center unit 40 via the communication device 31. When the fourth condition is not fulfilled, the onboard unit 30 makes a transition to step S105, and when it is determined that the onboard LAN 45 is not started, again makes a transition to step S104. When it is determined in step S105 that the onboard LAN 45 has been started, the onboard unit 30 ends the onboard operations.

The center operations which are shown in FIG. 3 and performed by the center unit 40 are explained below.

When it is determined that the transmission destination of the center notification is the registered vehicle on the basis of the vehicle identification information included in the center notification received by the communication device 41, the center unit 40 takes the registered vehicle as the object vehicle 20 and executes center operations.

In the center operations, in step S201, the center unit 40 determines whether there is an operational omission of equipment in the object vehicle 20 on the basis of the vehicle state information included in the center notification. In the configuration shown in FIG. 4, the center unit 40 detects that a window closing omission is present on the basis of window state information, detects that a door lock locking omission is present on the basis of door lock state information, and detects that a hazard lamp turn-off omission is present on the basis of hazard lamp state information.

When the center unit 40 determines that at least one operational omission equipment is present in the object vehicle 20, the center unit makes a transition to step S202. Meanwhile, when the center unit 40 determines that there is no operational omission of equipment in the object vehicle 20, the center unit ends the center operations.

In step S202, the center unit 40 performs a driver position determination operation of determining whether the driver is present in the vicinity of the object vehicle 20. Performed in step S202 are a terminal unit position determination operation and a communication state determination operation.

In step S202, the center unit 40 initially performs the terminal unit position determination operation. Where it is detected, as a result of the terminal unit position determination operation, that the distance from the object vehicle 20 to the registered terminal unit 50 exceeds the predetermined distance, the center unit performs the communication state determination operation. Where the result of the communication state determination information demonstrates that the electronic key information included in the center information indicates that "the external communication is not established", the center unit 40 determines that the driver is not present in the vicinity of the object vehicle 20.

When it is determined that the driver is not present in the vicinity of the object vehicle 20, the center unit 40 makes a transition to step S203. Meanwhile, where it is determined that the driver is present in the vicinity of the object vehicle 20, the center unit 40 ends the center operations.

In step S203, the center unit 40 performs the vehicle position determination operation of determining whether the object vehicle 20 is parked in an object facility. When it is determined that the object vehicle 20 is not parked in the object facility, the center unit 40 makes a transition to step S204. Where it is determined that the object vehicle 20 is parked in the object facility, the center unit 40 ends the center operations.

In step S204, the center unit 40 transmits an operational omission notification to the registered terminal unit 50, for example, by electronic mail. As shown in FIG. 4, the electronic mail of the operational omission notification includes, for example, information indicating that a window is open, information indicating that a door lock is not closed, and information indicating that the hazard lamp is blinking.

(Effects of the Embodiment)

In the present embodiment, when an operational omission of equipment of the object vehicle 20 is detected, an operational omission notification to the registered terminal unit 50 is performed only when it is detected that the object vehicle 20 is parked outside the object facility classified into the predetermined category. When the object vehicle 20 is parked in the object facility classified into the predetermined category, the operational omission notification to the registered terminal unit 50 is not performed. Therefore, by setting, as appropriate, the object facility, it is possible to reduce the number of operational omission notifications that are unnecessary for the users including drivers.

(Other Embodiments)

The above-described embodiment may be configured in the following manner.

In the above-described embodiment, whether the object vehicle 20 is parked in the object facility is determined by determining whether the distance between the object vehicle 20 and the object facility that is the closest to the object vehicle 20 is equal to or less than the notification determination distance. However, whether the object vehicle 20 is parked in the object facility may be also determined by determining whether the position coordinates of the object vehicle 20 are within the region of object facility on map information.

Further, in the above-described embodiment, it is determined whether the object vehicle 20 is parked in the object facility, but whether to perform the operational omission notification may be also determined by determining whether the object vehicle 20 is parked in an object region including the object facility and a predetermined region adjacent to the object facility. For example, the parking site of the owner of the object vehicle 20 and a region within a predetermined distance from the parking site may be taken as the object region.

Further, in the above-described embodiment, the center unit 40 determines that there is an operational omission of equipment in the object vehicle 20 and then performs the driver position determination operation and the vehicle position determination operation, but only the vehicle position determination operation may be performed. In this case, the onboard unit 30 may transmit the center notification only when the external communication is not established, instead of performing the driver position determination operation.

Further, in the above-described embodiment, the center unit 40 executes the operational omission detection operation, but the operational omission detection operation may be also executed by the onboard unit 30.

Further, in the above-described embodiment, the notification determination distance may differ according to the category (type) of the object facility. For example, the notification determination distance in the case in which the object facility that is the closest to the object vehicle 20 is a gasoline stand, may be set larger than the notification determination distance in the case in which the object facility that is the closest to the object vehicle 20 is a charging stand.

In the above-described embodiment, the vehicle carrying the onboard unit 30 may be a two-wheel vehicle.

The invention can be applied to an operational omission notification method and an operational omission notification system that perform operational omission notification when an operational omission of vehicle equipment is detected.

What is claimed is:

1. An operational omission notification method for performing operational omission notification to a terminal unit of a user of a vehicle when the user forgets to operate an equipment of the vehicle after the vehicle has been parked, the method comprising:
   receiving, using a communication device, information relating to a state of the equipment of the vehicle after the vehicle has been parked;
   detecting, using a notification determination unit, an operational omission of the equipment installed on the vehicle after the vehicle has been parked on the basis of the information relating to the state of the equipment received by the communication device;
   calculating, using the notification determination unit, a distance between the vehicle and the terminal unit and determining whether the distance is more than a predetermined threshold;
   determining, using the notification determination unit, whether the vehicle is parked in a facility for servicing the vehicle; and
   notifying the terminal unit of the operational omission when it is determined that the vehicle is not parked within the facility for servicing the vehicle and the distance between the vehicle and the terminal unit is more than the predetermined threshold.

2. An operational omission notification system for performing operational omission notification to a terminal unit of a user of a vehicle when the user forgets to operate an equipment of the vehicle after the vehicle has been parked, the system comprising:
   a communication device that receives information relating to a state of the equipment of the vehicle after the vehicle has been parked; and
   a notification determination unit that detects an operational omission on the basis of the information relating to the state of the equipment received by the communication device, determines whether a distance between the vehicle and the terminal unit is more than a predetermined threshold, determines whether the vehicle is parked in a facility for servicing the vehicle, and when it is determined that the vehicle is not parked within the facility for servicing the vehicle and the distance between the vehicle and the terminal unit exceeds the predetermined threshold, determines to notify the terminal unit of the user of the operational omission.

* * * * *